United States Patent
Egawa

(10) Patent No.: US 9,310,622 B2
(45) Date of Patent: Apr. 12, 2016

(54) LIGHT SOURCE APPARATUS AND PROJECTOR

(71) Applicant: SEIKO EPSON CORPORATION, Tokyo (JP)

(72) Inventor: Akira Egawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 70 days.

(21) Appl. No.: 14/184,119

(22) Filed: Feb. 19, 2014

(65) Prior Publication Data

US 2014/0232992 A1    Aug. 21, 2014

(30) Foreign Application Priority Data

Feb. 21, 2013    (JP) .................................. 2013-032096

(51) Int. Cl.
| | |
|---|---|
| G03B 21/14 | (2006.01) |
| G02B 27/48 | (2006.01) |
| F21V 14/06 | (2006.01) |
| F21V 14/08 | (2006.01) |
| G02B 5/02 | (2006.01) |
| G02B 5/04 | (2006.01) |
| F21S 10/00 | (2006.01) |
| G03B 21/20 | (2006.01) |

(52) U.S. Cl.
CPC ................ *G02B 27/48* (2013.01); *F21S 10/007* (2013.01); *F21V 14/06* (2013.01); *F21V 14/08* (2013.01); *G02B 5/0278* (2013.01); *G02B 5/045* (2013.01); *G03B 21/208* (2013.01)

(58) Field of Classification Search
CPC ........................... G03B 21/204; G03B 21/2013
USPC ........ 353/31, 38, 84, 85, 94, 98, 102; 348/84, 348/293; 313/506, 501, 503
See application file for complete search history.

(56) References Cited

U.S. PATENT DOCUMENTS

| | | | | |
|---|---|---|---|---|
| 8,231,227 B2* | 7/2012 | Kurosaki | ......................... | 353/31 |
| 2003/0039036 A1* | 2/2003 | Kruschwitz et al. | ........... | 359/707 |
| 2004/0189955 A1* | 9/2004 | Park | ....................... | G02B 27/48 |
| | | | | 353/84 |
| 2008/0165401 A1 | 7/2008 | Kasazumi | | |
| 2009/0040474 A1 | 2/2009 | Kamijima | | |
| 2009/0284148 A1* | 11/2009 | Iwanaga | ........................ | 313/506 |
| 2012/0242912 A1* | 9/2012 | Kitano | ........................... | 348/759 |
| 2013/0100417 A1* | 4/2013 | Yang et al. | ....................... | 353/31 |
| 2014/0125956 A1* | 5/2014 | Chifu | ..................... | G02B 27/48 |
| | | | | 353/31 |

FOREIGN PATENT DOCUMENTS

| | | |
|---|---|---|
| JP | A-2007-334240 | 12/2007 |
| JP | A-2008-46523 | 2/2008 |
| JP | A-2009-42284 | 2/2009 |
| WO | WO 2006/090681 A1 | 8/2006 |
| WO | WO 2006/095855 A1 | 9/2006 |

* cited by examiner

*Primary Examiner* — Sultan Chowdhury
(74) *Attorney, Agent, or Firm* — Oliff PLC

(57) ABSTRACT

A light source apparatus includes a light source unit, a light diffusion element that is provided so as to be rotated about a predetermined rotation shaft and includes a plurality of diffusion regions which are consecutively formed around the rotation shaft, and a motor that rotates the light diffusion element so that a region on which light from the light source unit is incident in the light diffusion element is moved between the plurality of diffusion regions. The plurality of diffusion regions include a first diffusion region, and a second diffusion region which has diffusion characteristics different from diffusion characteristics of the first diffusion region and is provided so as to be adjacent to the first diffusion region.

14 Claims, 12 Drawing Sheets

LIGHT SOURCE APPARATUS AND PROJECTOR

BACKGROUND

1. Technical Field

The present invention relates to a light source apparatus and a projector.

2. Related Art

In recent years, a projector using a laser light source has been developed. In this kind of projector, a wavelength range of the laser light source is narrow, and thus a color reproduction range can be made sufficiently wide. In addition, miniaturization can be achieved or the number of constituent elements can be reduced.

However, when display is performed in the projector using a laser light source, light interference occurs in a scatterer such as a screen, and thus a phenomenon of a so-called speckle may occur in which bright points and dark points are distributed in a stripe shape or a patchy pattern.

The speckle can bring adverse effects since the speckle produces glaring which is unpleasant for the observer while the observer views an image. Particularly, since laser light has high coherence, there is a high possibility of speckle occurring. In addition, in the same manner, the speckle is problematic in a case of using an LED as a light source in addition to the case of using the laser light source. Even in a case of a lamp light source, light coherence has recently increased due to a shortened arc. Therefore, in the development of a projector, a technique of removing the speckle has become important.

In relation to this task, International Publication No. WO2006/090681 discloses a projector which forms an image which is projected and displayed while changing a travel direction of laser light over time by using deflection means for changing a travel direction of laser light. In International Publication No. WO2006/090681, a travel direction of laser light is changed over time, and thus a plurality of speckles may occur over time. The speckles are observed by an observer of an image in a superimposing manner over time, and, thus, according to the projector of International Publication No. WO2006/090681, an image with fewer speckles (it is hard to observe speckles) can be displayed.

The projector of International Publication No. WO2006/090681 does not remove a speckle itself. There are individual differences in a speckle-reduction effect, and thus a new speckle-reduction technique is required.

SUMMARY

An advantage of some aspects of the invention is to provide a light source apparatus capable of reducing speckle noise with a simple configuration. In addition, another advantage of some aspects of the invention is to provide a projector which has the light source apparatus and can display a high quality image with fewer speckles.

An aspect of the invention is directed to a light source apparatus including a light source unit; a light diffusion element that is provided so as to be rotated about a predetermined rotation shaft and includes a plurality of diffusion regions which are consecutively formed around the rotation shaft; and a driving device that rotates the light diffusion element so that a region on which light from the light source unit is incident in the light diffusion element is moved between the plurality of diffusion regions, in which the plurality of diffusion regions include a first diffusion region, and a second diffusion region which has diffusion characteristics different from diffusion characteristics of the first diffusion region and is provided so as to be adjacent to the first diffusion region.

It should be noted that, in the present specification, "diffusion characteristics" include respective characteristics of a "diffusion angle" of light emitted from the light diffusion element, a "diffusion direction" which is a direction of a central axis of light beams emitted from the light diffusion element, and a "cross-sectional shape" which is a light amount distribution of light emitted from light diffusion element on a plane perpendicular to a normal line of a surface on a light emitting side of the light diffusion element.

The meaning in which the "diffusion characteristics" of the first diffusion region and the second diffusion region are different from each other is that the first diffusion region and the second diffusion region are different from each other in at least one characteristic among the characteristics of the "diffusion angle", the "diffusion direction", and the "cross-sectional shape".

When the light source apparatus according to the aspect of the invention is used in a projector, the projector displays an image on a projection surface by using image light which is formed using diffused light emitted from the first diffusion region and image light which is formed using diffused light emitted from the second diffusion region. Since diffusion characteristics of the first diffusion region and the second diffusion region are different from each other, the image light formed using the diffused light emitted from the first diffusion region is different from the image light formed using the diffused light emitted from the second diffusion region in terms of an incidence angle distribution on the projection surface. For this reason, different speckles occur on the projection surface based on image light with different incidence angle distributions.

Since, in the light source apparatus, a region on which light from the light source unit is incident is changed over time between a plurality of diffusion regions due to the rotation of the light diffusion element, and a diffusion angle of diffused light, that is, the incidence angle distribution of image light to the projection surface is changed over time. For this reason, occurring speckles are changed over time on the projection surface. An observer of an image observes a plurality of speckles occurring in this manner, in a superimposition manner over time, and thus observes an image with fewer speckles. Therefore, according to the above-described configuration, it is possible to implement a light source apparatus capable of reducing the occurrence of speckles.

The light source apparatus of the aspect of the invention may be configured such that at least one light diffusion structure selected from the group consisting of a light scattering structure, a diffraction structure, and a lens structure is provided in the first diffusion region, and at least one light diffusion structure selected from the group is provided in the second diffusion region.

According to this configuration, it is possible to appropriately change a diffusion angle of light, and a degree of freedom of design of the light diffusion element increases.

The light source apparatus of the aspect of the invention may be configured such that a light diffusion structure provided in the first diffusion region is different from a light diffusion structure provided in the second diffusion region.

According to this configuration, a diffusion angle is greatly changed at a boundary between the first diffusion region and the second diffusion region which are adjacent to each other, and thus it is possible to generate speckles with patterns which are remarkably different from each other. Therefore, it is possible to provide a light source apparatus capable of realizing illumination with a high speckle-reduction effect.

The light source apparatus of the aspect of the invention may be configured such that the light diffusion element includes a plate-shaped base, a first layer provided on one surface of the base, and a second layer provided on the other surface of the base; in the plurality of diffusion regions, the first layer overlaps the second layer in a plan view when a direction in which light is incident on the light diffusion element is a plan view direction, at least one light diffusion structure selected from the group consisting of a light scattering structure, a diffraction structure, and a lens structure is provided in the first layer, and at least one of a prism structure and a lens structure is provided in the second layer.

According to this configuration, since a travel direction of light of which a diffusion angle is changed by the first layer can be further changed by the second layer, incidence angle distributions can be considerably changed. Therefore, it is possible to provide a light source apparatus capable of realizing illumination with a high speckle-reduction effect.

The light source apparatus of the aspect of the invention may be configured such that the light source unit includes a plurality of light sources; and a condensing optical system that collects light beams emitted from the plurality of light sources at the light diffusion element.

According to this configuration, since light collected in advance is incident on the light diffusion element, even if a diffusion angle of diffused light formed in the diffused light element increases, light is suppressed from being spread compared with a case where light is not collected. For this reason, it is possible to provide a light source apparatus capable of improving illumination efficiency.

The light source apparatus of the aspect of the invention may be configured such that the light source apparatus further includes a control unit that intermittently changes an output of at least one light source of the plurality of light sources.

According to this configuration, a light amount distribution of diffused light can be changed, and thus it is possible to generate different speckles based on a light amount distribution. Therefore, it is possible to provide a light source apparatus capable of realizing illumination with a high speckle-reduction effect.

The light source apparatus of the aspect of the invention may be configured such that the control unit reduces an output of a light source of the plurality of light sources while the control unit increases outputs of the other light sources of the plurality of light sources.

According to this configuration, it is possible to suppress a change in a total amount of light beams emitted from a plurality of light sources, and thus speckles can be reduced and a favorable image can be displayed.

Another aspect of the invention is directed to a projector including the light source apparatus described above; a light modulation element chat modulates light emitted from the light source apparatus; a superimposition optical system that divides light emitted from the light diffusion element into a plurality of small light beams and superimposes the plurality of small light beams on the light modulation element; and a projection optical system that projects light modulated by the light modulation element.

According to this configuration, an incidence angle distribution of image light on the projection surface is changed over time, and thus it is possible to generate a plurality of different speckles over time. Therefore, it is possible to provide a projector capable of displaying an image with fever speckles by superimposing a plurality of different speckles over time.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a projector according to the first embodiment of the invention will be described with reference to FIGS. 1 to 5B. In addition, in all of the following drawings, for better understanding of the drawings, dimensions or proportions of respective constituent elements are made to be appropriately different from each other.

Figure 1:
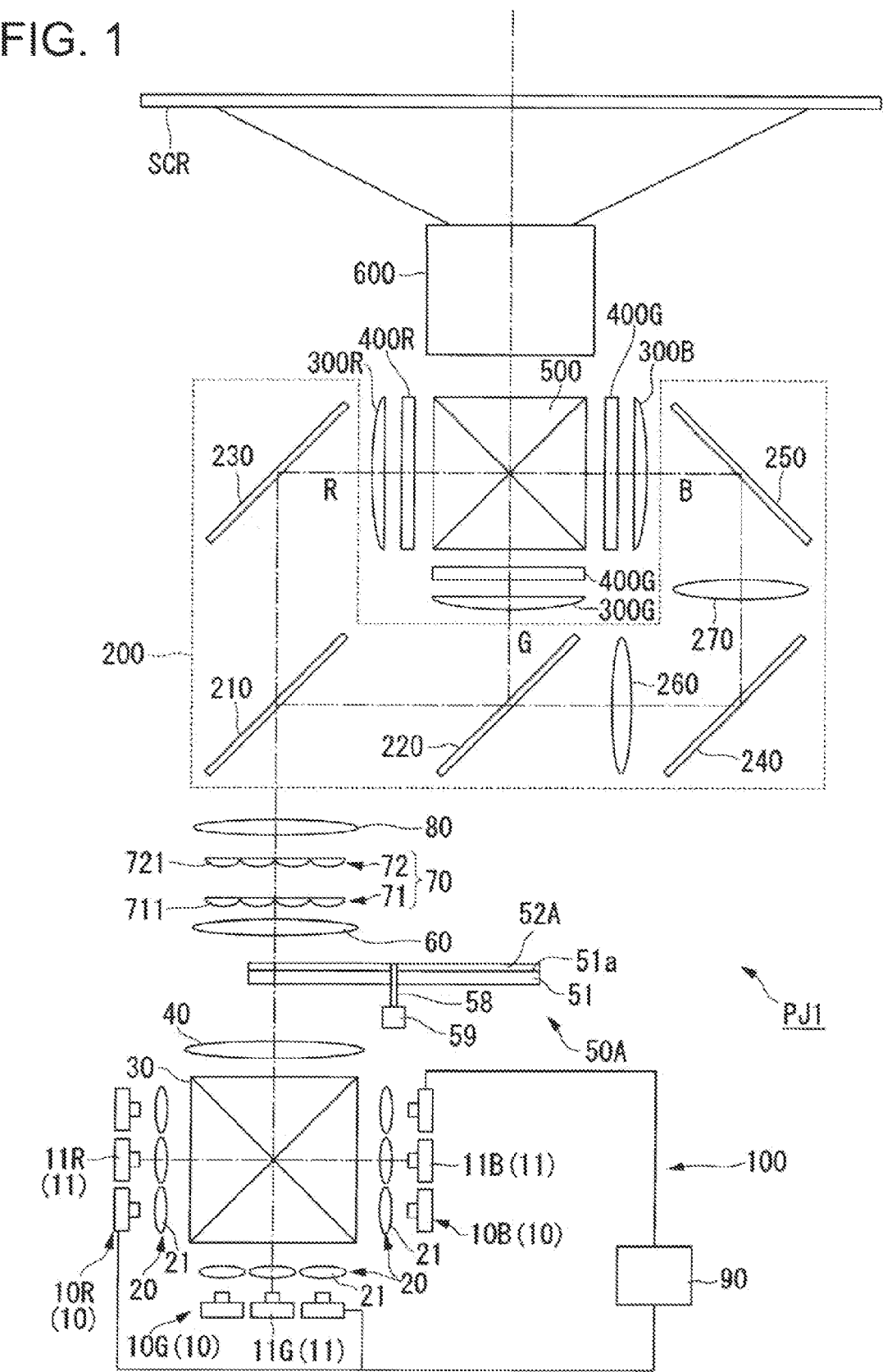
FIG. 1 is a schematic diagram illustrating a projector according to a first embodiment.

FIG. 1 is a schematic diagram illustrating a projector PJ1 according to the present embodiment. As illustrated in FIG. 1, the projector PJ1 includes a light source apparatus 100, a color split optical system 200, a liquid crystal light valve (light modulation element) 400R, a liquid crystal light valve 400G, a liquid crystal light valve 400B, a color combination element 500, and a projection optical system 600.

The projector PJ1 schematically operates as follows. Light emitted from the light source apparatus 100 is split into a plurality of color light beams by the color split optical system 200. The plurality of color light beams split by the color split optical system 200 are respectively incident on the corresponding liquid crystal light valve 400R (light modulation element), liquid crystal light valve 400G (light modulation element), and liquid crystal light valve 400B (light modulation element) so as to be modulated. A plurality of color light beams modulated by the liquid crystal light valve 400R, the liquid crystal light valve 400G, and the liquid crystal light valve 400B are incident on the color combination element 500 so as to be combined with each other. The light (image light) combined by the color combination element 500 is enlarged and projected onto a screen SCR such as a wall or a screen by the projection optical system 600, thereby displaying a full-color projection image.

Hereinafter, each constituent element of the projector PJ1 will be described.

The light source apparatus 100 includes a light source unit 10 (light source), a collimating optical system 20, a color combination optical system 30, a condensing optical system 40, a light diffusion element 50A, a pickup lens 60, lens arrays 70, a superimposition lens 80, and a control unit 90. The lens arrays 70 and the superimposition lens 80 form a superimposition optical system.

The light source unit 10 has a plurality of laser light sources 11 (laser light source array) and emits laser light which is coherent light. In the light source unit 10, for example, the laser light sources 11 are arranged in a two-dimensional shape, thereby forming a light source with high output power. In FIG. 1, the light source unit 10 is shown to include a red light source unit 10R having red laser light sources 11R emitting red light, a green light source unit 10G having green laser light sources 11G emitting green light, and a blue light source unit 10B having blue laser light sources 11B emitting blue light.

The collimating optical system 20 has a plurality of collimator lenses 21. Respective laser light beams emitted from the laser light sources of the light source unit 10 (the red light source unit 10R, the green light source unit 10G, and the blue light source unit 10B) are incident on the collimator lenses 21, which are provided so as to correspond to the laser light sources of the light source unit 10 in a one-to-one relationship, so as to be collimated and then emitted.

The color combination optical system 30 is constituted by a dichroic prism or the like. The dichroic prism has a structure in which four triangular prisms are joined together. Surfaces which are joined together in the triangular prisms are inner surfaces of the dichroic prism. A mirror surface which reflects red light and transmits green light therethrough and a mirror surface which reflects blue light and transmits green light therethrough are formed so as to be perpendicular to each other in the inner surfaces of the dichroic prism. Green light incident on the dichroic prism passes through the mirror surface and is emitted without change. Red light and blue light incident on the dichroic prism are selectively reflected by or transmitted through the mirror surfaces and are emitted in the same direction as the emission direction of the green light. In this way, three color light beams are superimposed and combined, and the combined color light is emitted toward the condensing optical system 40.

The condensing optical system 40 collects the light emitted from the color combination optical system 30 at the light diffusion element 50A. If the light incident on the light diffusion element 50A is collected in advance, light is suppressed from being spread compared with a case where light is not collected even if a diffusion angle of diffused light formed in the light diffusion element 50A increases. For this reason, a loss of light is suppressed on a downstream side of a light path, and thus it is possible to provide a light source apparatus capable of improving illumination efficiency.

The light diffusion element 50A includes a substrate 51 which is circular in a plan view and a light diffusion layer 52A provided on a first main surface 51a of the substrate 51.

The substrate 51 is formed using a substance which transmits laser light emitted from the light source unit 10 therethrough as a material, and, for example, quartz glass, quartz crystal, sapphire (single crystal corundum), transparent resin, or the like may be used. Among the materials, the quarts glass, the quartz crystal, and the sapphire are preferably used so as not to be deformed due to heating caused by irradiation with laser light even if the substrate is used for a long time.

A rotation shaft 58 which is provided in parallel to the normal line of the first main surface 51a passing through a center of the substrate 51 is connected to a motor 59 which is provided as a driving device, and thus the light diffusion element 50A is rotatably provided. Incident light is converted into diffused light by changing a diffusion angle of the incident light by the use of the light diffusion layer 52A provided in the light diffusion element 50A.

Here, the "diffusion angle" in the present specification indicates a spread angle with respect to a central axis direction of light beams. Specifically, the diffusion angle indicates an angle (full width at half maximums (FWHM)) at which an intensity is a half of a peak intensity in a light intensity distribution (a transverse axis: radiation angle, and a longitudinal axis: light intensity) of diffused light on a plane perpendicular to a central axis of light beams.

Figure 2A:
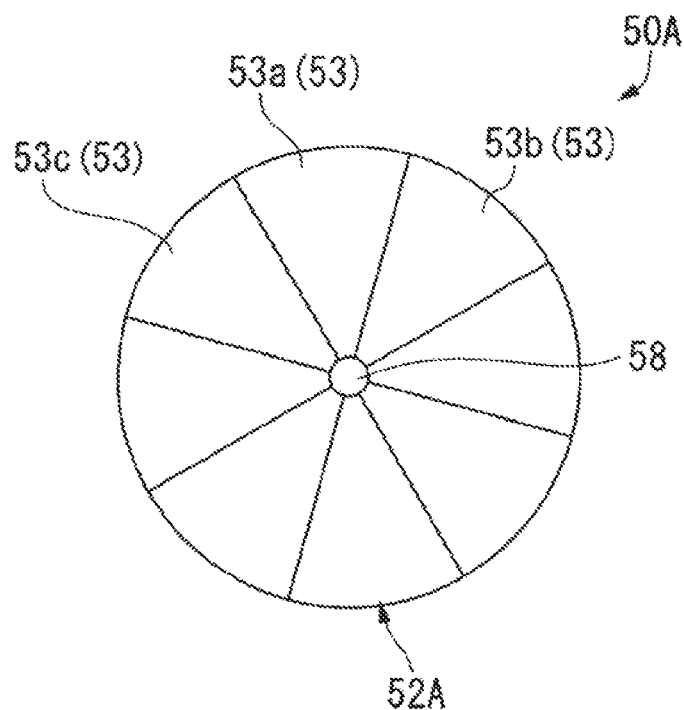
FIGS. 2A and 2B are schematic diagram illustrating a light diffusion element.
Figure 2B:
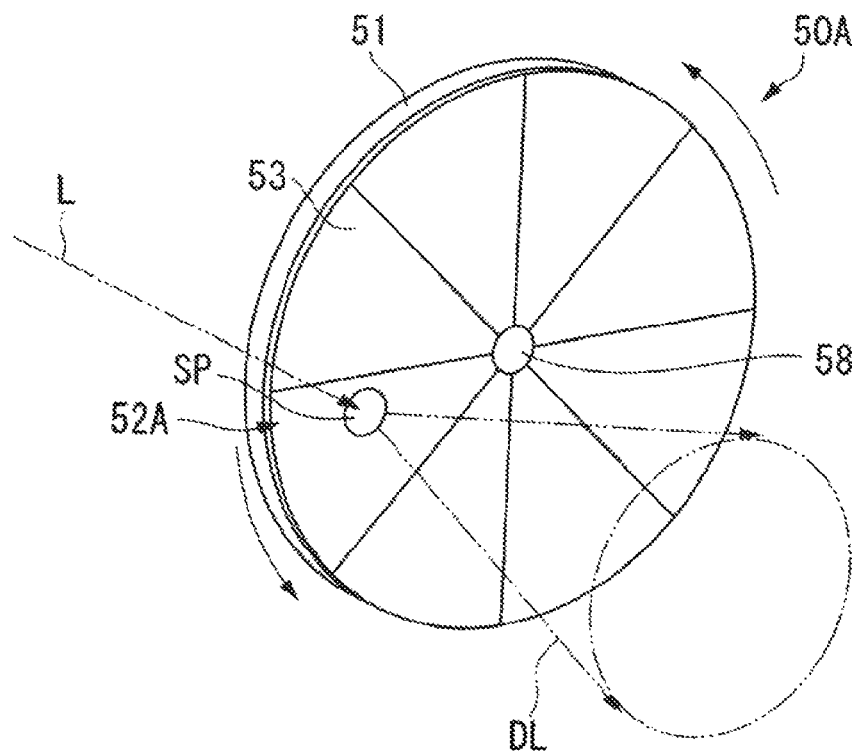

FIGS. 2A and 2B are schematic diagrams illustrating the light diffusion element 50A, in which FIG. 2A is a schematic plan view of the light diffusion element 50A, and FIG. 2B is a diagram illustrating a state in which the light diffusion element 50A is driven.

As illustrated in FIG. 2A, the light diffusion layer 52A is consecutively provided in the circumferential direction around the rotation shaft 58 of the substrate 51. The light diffusion layer 52A may employ a configuration in which fillers (light scattering structure) which are light-transmissive light scatterer with a high refractive index, such as $TiO_2$, are dispersed in a light-transmissive binder. In the present embodiment, the fillers form a light diffusion structure. As the binder, for example, a silicone resin which has light transmittance and high heat resistance may be suitably used. This light diffusion layer 52A may be formed by applying a precursor of a binder in which fillers are dispersed on the substrate 51 and curing the precursor.

In addition, the light diffusion layer 52A has a plurality of (eight in FIGS. 2A and 2B) diffusion regions 53 arranged in the circumferential direction of the rotation shaft 58. The diffusion regions 53 adjacent to each other have diffusion characteristics different from each other. In FIG. 2A, among the plurality of diffusion regions, diffusion characteristics of the diffusion region 53a (first diffusion region) are different from diffusion characteristics of the diffusion region 53b (second diffusion region) and the diffusion region 53c (second diffusion region) which are adjacent to the first diffusion region 53a. In the present embodiment, a diffusion angle corresponds to a diffusion characteristic, and the respective diffusion regions 53 are formed so that a diffusion angle of light emitted from the diffusion region 53a is different from diffusion angles of light beams emitted from the diffusion region 53b and the diffusion region 53c. The diffusion region 53b and the diffusion region 53c may have the same characteristics, or may have the characteristics different from each other.

A diffusion angle can be controlled by changing an amount of fillers and the kind of filler included in the light diffusion layer 52A (the diffusion regions 53). For example, in a case of increasing a diffusion angle of emitted light, control may be performed so that the amount of fillers included in the light diffusion layer 52A is increased or the kind of filler may be changed to a filler with a relatively high refractive index. In a case of decreasing a diffusion angle of emitted light, control may be performed so that the amount of fillers included in the light diffusion layer 52A is decreased or the kind of filler may be changed to a filler with a relatively low refractive index.

As illustrated in FIG. 2B, in the light diffusion element 50A having this light diffusion layer 52A, incident light L is scattered by the fillers of the light diffusion layer 52A so as to be emitted as light (diffused light DL) with a changed diffusion angle.

At this time, the light diffusion element 50A is rotated about the rotation shaft 58 by driving the motor 59 (not illustrated). For this reason, an irradiation position SP irradiated with the incident light L in the light diffusion layer 52A is changed in the circumferential direction over time, and the incident light L is sequentially incident on a plurality of diffusion regions 53 with different diffusion angles.

FIGS. 3A to 3D are diagrams illustrating a state of light diffused in the light diffusion element 50A.

Figure 3A:
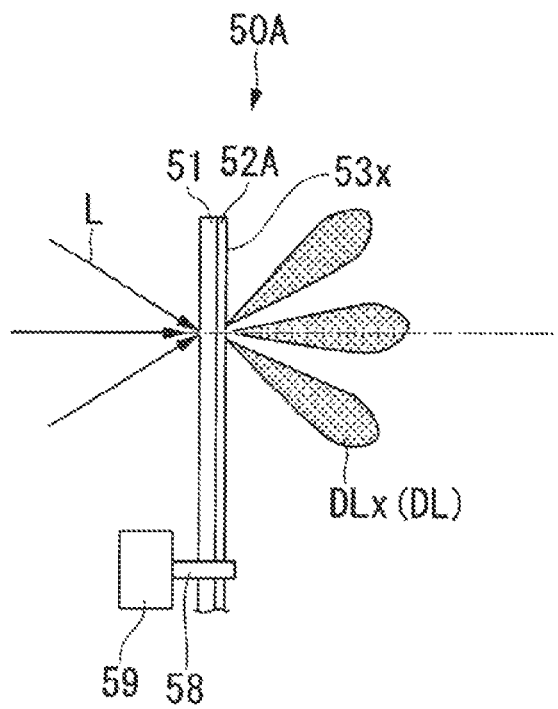
FIGS. 3A to 3D are diagrams illustrating a state in which light is diffused by the light diffusion element.
Figure 3B:
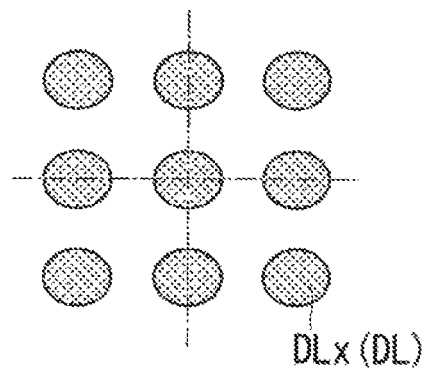
Figure 3C:
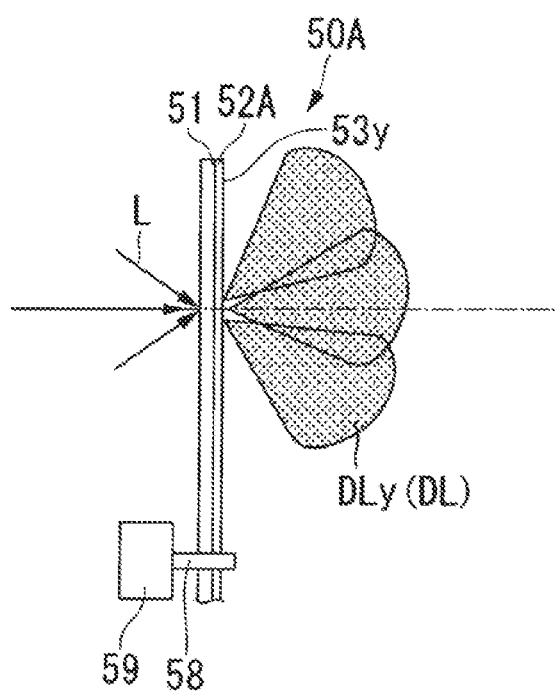
Figure 3D:
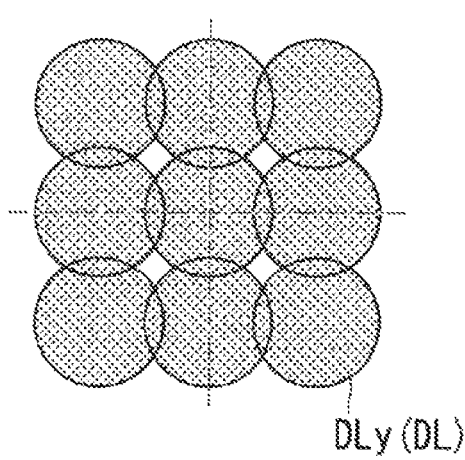

FIGS. 3A and 3C are schematic cross-sectional views around the light diffusion element 50A. FIGS. 3B and 3D are diagrams schematically illustrating a light amount distribution of the diffused light DL emitted from the light diffusion element 50A of FIG. 1 on a plane perpendicular to the normal line of the surface on the light emission side of the light diffusion element 50A. The "plane perpendicular to the normal line" in FIGS. 3B and 3D is a plane which is assumed to exist, for example, between the pickup lens 60 and the lens arrays 70. In the following description, the "light amount distribution of the diffused light DL on the plane perpendicular to the normal line of the surface on the light emission side of the light diffusion element 50A" is referred to as a "cross-sectional shape of the diffused light DL" on the plane perpendicular to the normal line in some cases.

FIGS. 3A and 3B illustrate a state in which the incident light L incident on a diffusion region 53x is diffused, and FIGS. 3C and 3D illustrate a state in which the incident light L incident on a diffusion region 53y adjacent to the diffusion region 53x is diffused.

In addition, FIGS. 3A to 3D illustrate a state in which the incident light L is diffused when the light source unit 10 of the projector PJ1 has a laser light source array with a 3×3 matrix. Further, a state is illustrated in which a diffusion angle of the diffused light DLy emitted from the diffusion region 53y is larger than a diffusion angle of the diffused light DLx emitted from the diffusion region 53x.

First, as illustrated in FIGS. 3A and 3B, laser light emitted from the laser light source array of the light source unit 10 (not illustrated) is collected by the condensing optical system 40 (not illustrated) and is applied to the diffusion region 53x at a certain moment. At that time, the laser light emitted from each of a plurality of laser light sources is incident on the diffusion region 53x with an incidence angle corresponding to a converging angle by the condensing optical system 40 (not illustrated), and is diffused by the diffusion region 53x.

In addition, as illustrated in FIGS. 3C and 3D, the light diffusion element 50A is rotated about the rotation shaft 58, thus the irradiation position SP irradiated with laser light illustrated in FIG. 2B is changed, and the laser light is applied to the diffusion region 53y at a certain moment.

At that time, the laser light emitted from each of a plurality of laser light sources is incident on the diffusion region 53y with an incidence angle corresponding to a converging angle by the condensing optical system 40 (not illustrated), and is diffused by the diffusion region 53y. In this case, since the diffusion angle of the diffused light DLy emitted from the diffusion region 53y is larger than the diffusion angle of the diffused light DLx emitted from the diffusion region 53x, the diffused light DLy spreads more than the diffused light DLx does.

In other words, if the light diffusion element 50A is used, a diffusion angle of the diffused light DL is changed every time a region on which the incident light L is incident is changed between a plurality of diffusion regions 53 with diffusion characteristics different from each other.

Referring to FIG. 1 again, the pickup lens 60 is disposed on a light path of diffused light emitted from the light diffusion element 50A so as to collimate the diffused light. The light having passed through the pickup lens 60 is incident on the lens arrays 70.

The lens arrays 70 include a first lens array 71 and a second lens array 72. The lens arrays 70 divide the light emitted from the pickup lens 60 into a plurality of light beams.

The first lens array 71 includes a plurality of first small lenses 711, and the second lens array 72 includes a plurality of second small lenses 721. The first small lenses 711 correspond to the second small lenses 721 in a one-to-one relationship. The light emitted from the pickup lens 60 is spatially divided so as to be incident on a plurality of first small lenses 711. The first small lenses 711 form images from light incident thereon on the corresponding second small lenses 721. Accordingly, a secondary light source image is formed in each of the plurality of second small lenses 721. In addition, exteriors of the first small lenses 711 and the second small lenses 721 are substantially similar to exteriors of image forming regions of the liquid crystal light valve 400R, the liquid crystal light valve 400G, and the liquid crystal light valve 400B.

The superimposition lens 80 superimposes the light beams emitted from the lens arrays 70 in the illuminated regions (the liquid crystal light valve 400R, the liquid crystal light valve 400G, and the liquid crystal light valve 400B). The lens arrays 70 and the superimposition lens 80 form a superimposition optical system. The diffused light (the diffused light DL illustrated in FIG. 2B) emitted from the light diffusion element 50A is divided spatially by the lens arrays 70, and is then superimposed by the superimposition lens 80. As illustrated in FIGS. 3A to 3D, the diffusion angle of the diffused light DL is changed over time, and thus a luminance distribution of light incident on the first lens array 71 is changed over time. However, a luminance distribution in the illuminated regions is made to be uniform by the superimposition optical system.

The control unit 90 controls emission intensity of each of the plurality of laser light sources 11. In addition, the control unit controls the light diffusion element 50A, the liquid crystal light valve 400R, the liquid crystal light valve 400G, and the liquid crystal light valve 400B.

The light source apparatus 100 according to the present embodiment has the above-described configuration.

The color split optical system 200 includes a dichroic mirror 210, a dichroic mirror 220, a mirror 230, a mirror 240, a mirror 250, a field lens 300R, a field lens 300G, a field lens 300B, a relay lens 260, and a relay lens 270. The dichroic mirror 210 and the dichroic mirror 220 are ones in which, for example, a dielectric multilayer film is laminated on a glass surface. The dichroic mirror 210 and the dichroic mirror 220 have characteristics of selectively reflecting color light in a predetermined wavelength band and of transmitting color light in other wavelength bands therethrough. In FIG. 1, the dichroic mirror 210 reflects green light and blue light, and the dichroic mirror 220 reflects green light.

Light emitted from the light source apparatus 100 is incident on the dichroic mirror 210. Red light R of the light is transmitted through the dichroic mirror 210 so as to be incident on the mirror 230, and is then reflected by the mirror 230 so as to be incident on the field lens 300R. The red light R is collimated by the field lens 300R and is then incident on the liquid crystal light valve 400R.

Green light G and blue light B of the light are reflected by the dichroic mirror 210 so as to be incident on the dichroic mirror 220. The green light G is reflected by the dichroic mirror 220 so as to be incident on the field lens 300G. The green light G is collimated by the field lens 300G and is then incident on the liquid crystal light valve 400G.

The blue light B having passed through the dichroic mirror 220 passes through the relay lens 260 so as to be reflected by the mirror 240, and then passes through the relay lens 270 so as to be reflected by the mirror 250 and then incident on the field lens 300B. The blue light B is collimated by the field lens 300B and is then incident on the liquid crystal light valve 400B.

Each of the liquid crystal light valve 400R, the liquid crystal light valve 400G, and the liquid crystal light valve 400B is constituted by a light modulation device such as, for example, a transmissive liquid crystal light valve. The liquid crystal light valve 400R, the liquid crystal light valve 400G, and the liquid crystal light valve 400B are electrically connected to a signal source (not illustrated) such as a PC which supplies an image signal including image information. The liquid crystal light valve 400R, the liquid crystal light valve 400G, and the liquid crystal light valve 400B modulate incident light for each pixel so as to form an image on the basis of the supplied image signal. The liquid crystal light valve 400R, the liquid crystal light valve 400G, and the liquid crystal light valve 400B respectively form a red image, a green image, and a blue image. Color light beams (formed image light beams) modulated by the liquid crystal light valve 400R, the liquid crystal light valve 400G, and the liquid crystal light valve 400B are incident on the color combination element 500.

The color combination element 500 is constituted by a dichroic prism or the like. The dichroic prism has a structure in which four triangular prisms are joined together. Surfaces which are joined together in the triangular prisms are inner surfaces of the dichroic prism. A mirror surface which reflects red light and transmits green light therethrough and a mirror surface which reflects blue light and transmits green light therethrough are formed so as to be perpendicular to each other in the inner surfaces of the dichroic prism. Green light incident on the dichroic prism passes through the mirror surface and is emitted without change. Red light and blue light incident on the dichroic prism are selectively reflected by or transmitted through the mirror surfaces and are emitted in the same direction as the emission direction of the green light.

In this way, three color light beams (image light beams) are superimposed and combined, and the combined image light is enlarged and projected onto the screen SCR by the projection optical system 600.

The projector PJ1 according to the present embodiment has the above-described configuration.

Figure 4A:
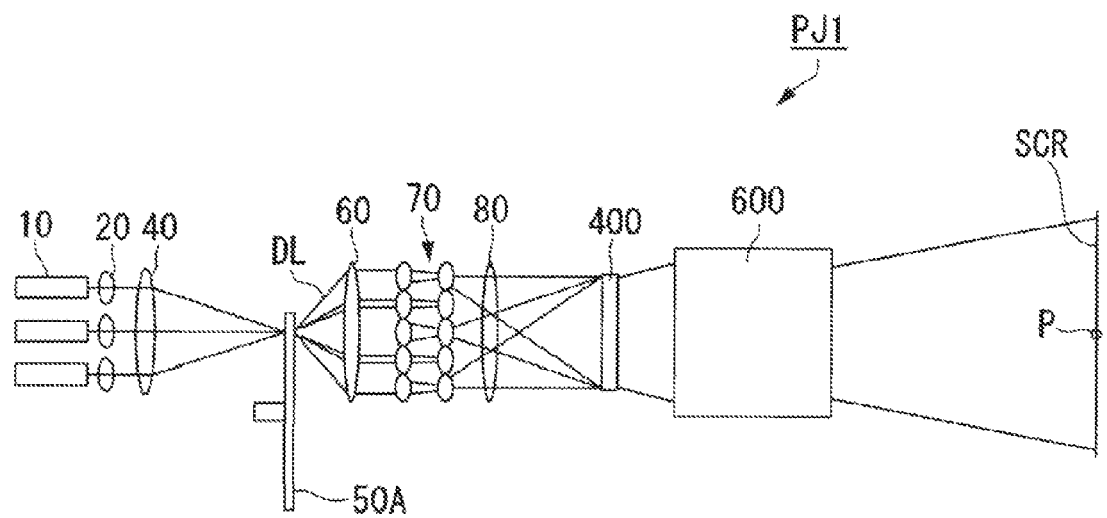
FIGS. 4A and 4B are schematic diagrams illustrating an effect achieved by the projector according to the first embodiment.
Figure 4B:
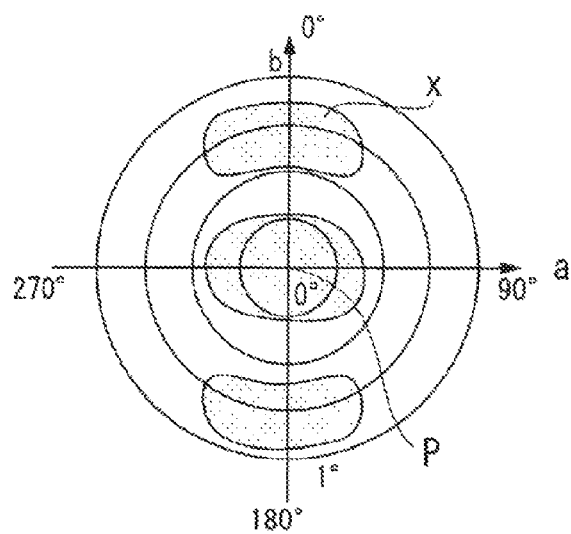
Figure 5A:
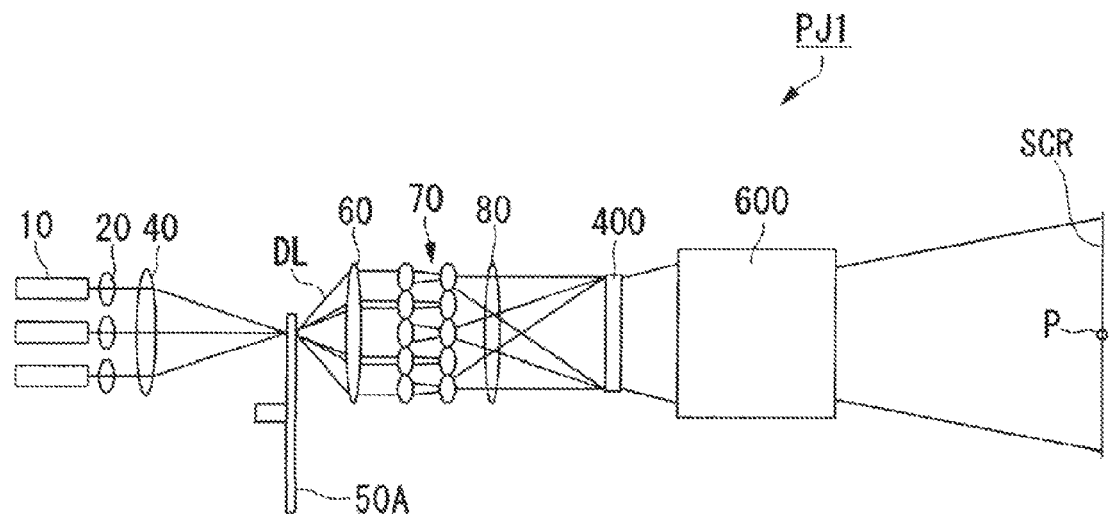
FIGS. 5A and 5B are schematic diagrams illustrating an effect achieved by the projector according to the first embodiment.
Figure 5B:
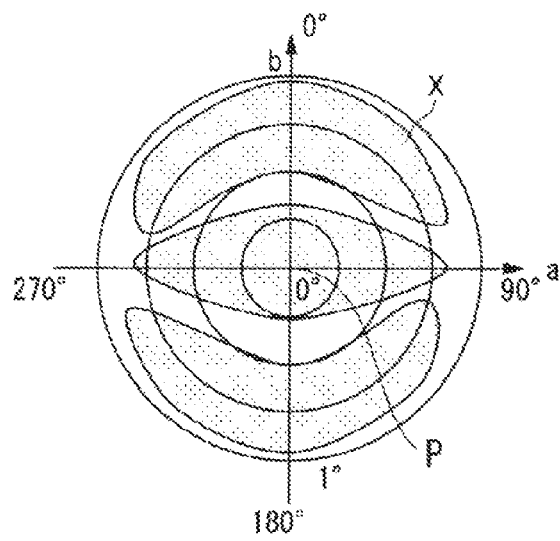

FIGS. 4A to 5B are schematic diagrams illustrating an effect achieved by the projector PJ1 according to the present embodiment. FIGS. 4A and 5A are schematic configuration diagrams of the projector PJ1. FIGS. 4B and 5B are diagrams illustrating an incidence angle distribution of image light incident on a point P on the screen SCR. In FIG. 4B and FIG. 5B, diffusion angles of the diffused light DL are different from each other, and FIG. 5B illustrates a state in which the diffusion angle of the diffused light DL is larger than the diffusion angle of the diffused light DL illustrated in FIG. 4B. In other words, a state in which incident light is incident on a diffusion region with a diffusion angle larger than in FIG. 4B is illustrated in FIG. 5B.

In addition, in FIGS. 4A and 5A, the color combination optical system 30 and the color combination element 500 are not illustrated. Further, only a single liquid crystal light valve is illustrated using the reference numeral 400.

In FIGS. 4B and 5B, an origin of the ab coordinate axes perpendicular to each other is used as the point P on the screen SCR. In addition, an incidence direction (azimuth angle) of image light incident on the point P is illustrated by setting the +b direction to 0°, the +a direction to 90°, the −b direction to 180°, and the −a direction to 270° in the clockwise direction from the b axis. Further, in a plurality of (four in FIGS. 4B and 5B) concentric circles centering on the origin, an incidence angle of image light with respect to the normal line at the point P of the screen SCR is illustrated by setting the origin to 0°, and setting the outermost concentric circle to 1°. In other words, FIGS. 4B and 5B illustrate that the image light is incident on the point P on the screen SCR with an angle corresponding to the shading region indicated by the reference sign X.

As illustrated in FIGS. 4B and 5B, in a case where a diffusion angle of the diffused light DL emitted from the light diffusion element 50A is relatively small (FIG. 4B), the point P on the screen SCR is also irradiated with the image light with a relatively narrow incidence angle distribution, and in a case where the diffusion angle of the diffused light DL emitted from the light diffusion element 50A is relatively large (FIG. 5B), the point P on the screen SCR is also irradiated with the image light with a relatively wide incidence angle distribution. Accordingly, speckles corresponding to the incidence angle distributions of the image light occur on the screen SCR.

The incidence angle distribution of the image light depends on the diffusion angle of the diffused light DL emitted from the light diffusion element 50A, and thus the diffusion angle of the diffused light DL is changed over time due to the rotation of the light diffusion element 50A. In other words, the incidence angle distribution of the image light is changed over time due to the rotation of the light diffusion element 50A. For this reason, the speckle is changed over time on the screen SCR. An observer of an image observes a plurality of speckles occurring in this manner, in a superimposing manner over time, and thus the speckles are reduced, thereby performing favorable image display.

According to the light source apparatus 100 with the above-described configuration, it is possible to display image with fewer speckles by the light source apparatus 100 being applied to the projector PJ1.

In addition, according to the projector PJ1 with the above-described configuration, it is possible to display a high quality image with fewer speckles by including the above-described light source apparatus 100 in the projector PJ1.

Further, although, in the present embodiment, the light diffusion layer 52A of the light diffusion element 50A employs a configuration in which fillers which are light-transmissive and have a high refractive index are dispersed in a light-transmissive binder, the invention is not limited thereto. The surface of the substrate 51 is made to be roughened without providing the light diffusion layer 52A, so as to form a light scattering structure on the surface of the substrate 51, and this may be used as a light diffusion element with a light diffusion structure.

In this case, the diffusion angle can be controlled by changing the extent of surface roughness. For example, in a case of increasing the diffusion angle of diffused light, the surface of the substrate 51 may be more roughened than in a surface roughening process which is used as a reference. In a case of decreasing the diffusion angle of diffused light, the surface of the substrate 51 may be less roughened than in the reference surface roughening process.

Second Embodiment

Figures 6A, 6B:
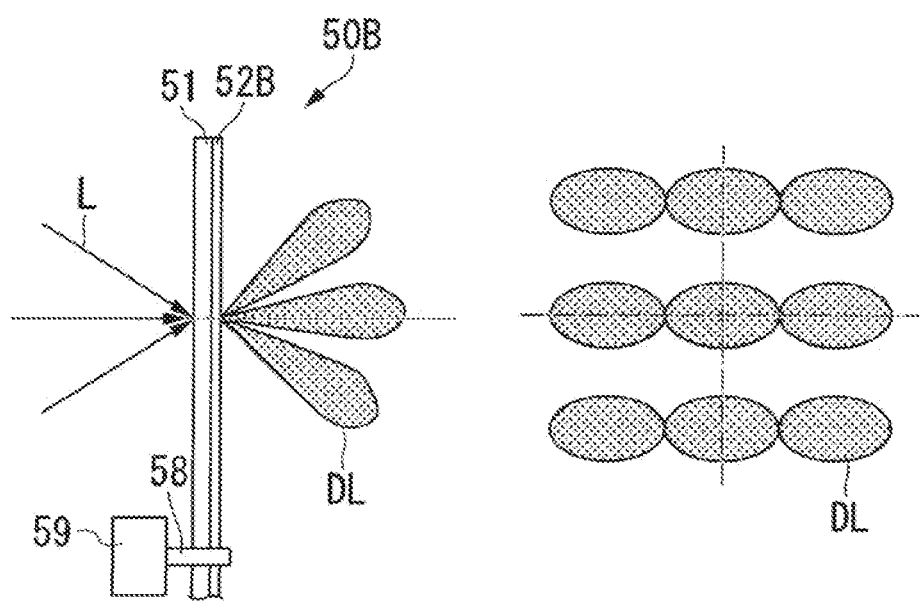
FIGS. 6A and 6B are schematic diagrams illustrating a light diffusion element according to a second embodiment.

FIGS. 6A and 6B are schematic diagrams illustrating a light diffusion element according to the second embodiment, and are schematic diagrams illustrating a configuration of the light diffusion element having a light diffusion layer using refraction of light. FIG. 6A is a diagram corresponding to FIGS. 3A and 3C described above, and FIG. 6B is a diagram corresponding to FIGS. 3B and 3D described above.

In the light diffusion element 50B illustrated in FIG. 6A, a plurality of microlenses are formed as a lens structure in the light diffusion layer 52B. In this light diffusion element 50B, a plurality of microlenses may employ various configurations such as a spherical lens, an aspherical lens, a cylindrical lens, and a free-curved surface lens as long as refraction of light on a lens surface is used.

For example, using microlenses which have different curvatures of lens surfaces between two directions perpendicular to each other, diffusion angles of the diffused light DL can be made different between the two directions. Here, the two directions are defined when the light diffusion element 50B is viewed from the top. Since the diffusion angles are anisotropic, a cross-sectional shape of the diffused light DL generated by the light diffusion element 50B becomes elliptical as illustrated in FIG. 6B.

In a case where the light diffusion element has the lens structure as the light diffusion structure, diffusion characteristics can be controlled by changing a curvature of a surface of the lens structure or a refractive index of a material forming the lens structure. For example, a curvature of a surface of a lens structure included in a first diffusion region is made to be different from a curvature of a surface of a lens structure included in a second diffusion region adjacent to the first diffusion region, and thus diffusion characteristics of the first diffusion region and the second diffusion region can be made different from each other.

If the lens structure is used, not only a diffusion angle but also a cross-sectional shape of the diffused light DL can be controlled as diffusion characteristics of the diffusion region. Only the cross-sectional shape of the diffused light DL may be controlled as diffusion characteristics of the diffusion region. As above, the first diffusion region and the second diffusion region with different diffusion characteristics of lens structures are provided, and thus it is possible to achieve an effect of reducing speckles.

Third Embodiment

FIGS. 7A to 7D are schematic diagrams illustrating a light diffusion element according to the third embodiment, and are schematic diagrams illustrating a configuration of the light diffusion element having a light diffusion layer using diffraction of light. FIGS. 7A to 7D are diagrams corresponding to the above-described FIGS. 3A to 3D.

Figure 7A:
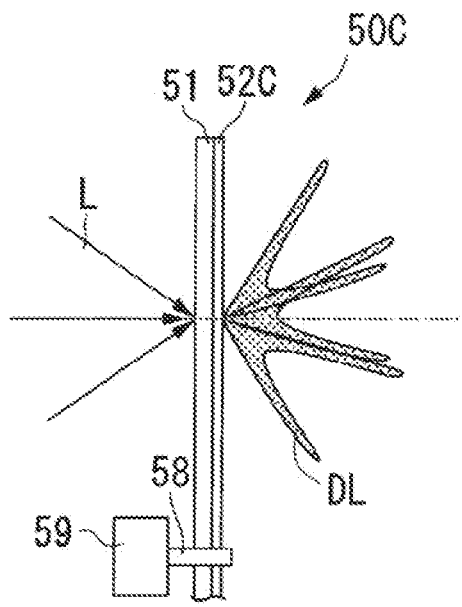
FIGS. 7A to 7D are schematic diagrams illustrating a light diffusion element according to a third embodiment.
Figure 7B:
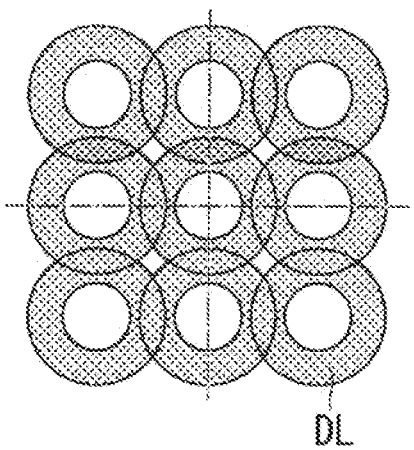
Figure 7C:
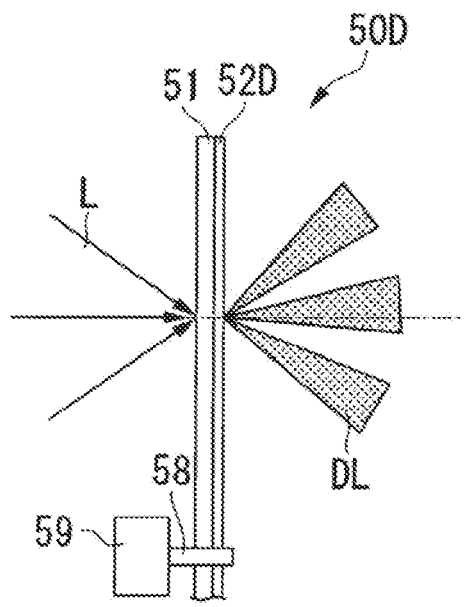
Figure 7D:
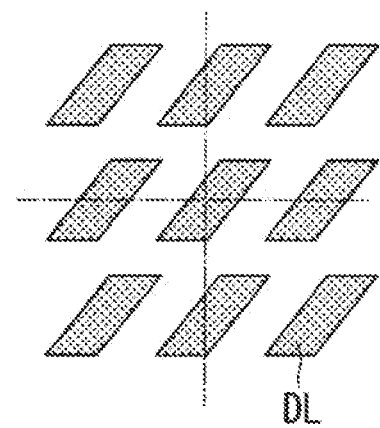

A light diffusion element 50C illustrated in FIG. 7A and a light diffusion element 50D illustrated in FIG. 7C have computer generated hologram (CGH) elements which are formed as diffraction structures in a light diffusion layer 52C and a light diffusion layer 52D. The CGH element can generate not only any diffusion angle of the diffused light DL but also any distribution shape of a cross-sectional shape of the diffused light DL, and thus can generate an annular ring shape as illustrated in FIG. 7B or a parallelogram shape (square shape) as illustrated in FIG. 7D. The diffraction structure may employ various configurations as long as diffraction of light is used.

In a case where the light diffusion element has the diffraction structure as the light diffusion structure, diffusion characteristics can be controlled by changing a pitch, a shape, or the like (a diffraction element pattern) of a diffraction grating. For example, a diffraction element pattern of a diffraction structure included in a first diffusion region is made to be different from a diffraction element pattern of a diffraction structure included in a second diffusion region adjacent to the first diffusion region, and thus diffusion characteristics of the first diffusion region end the second diffusion region can be made different from each other.

Using the diffraction structure can control not only the diffusion angle but also the cross-sectional shape of the diffused light DL as diffusion characteristics of diffusion regions. Only the cross-sectional shape of the diffused light DL may be controlled as diffusion characteristics of diffusion regions. As above, the first diffusion region and the second diffusion region with different diffusion characteristics of diffraction structures are provided, and thus it is possible to achieve an effect of reducing speckles.

Fourth Embodiment

Figure 8:
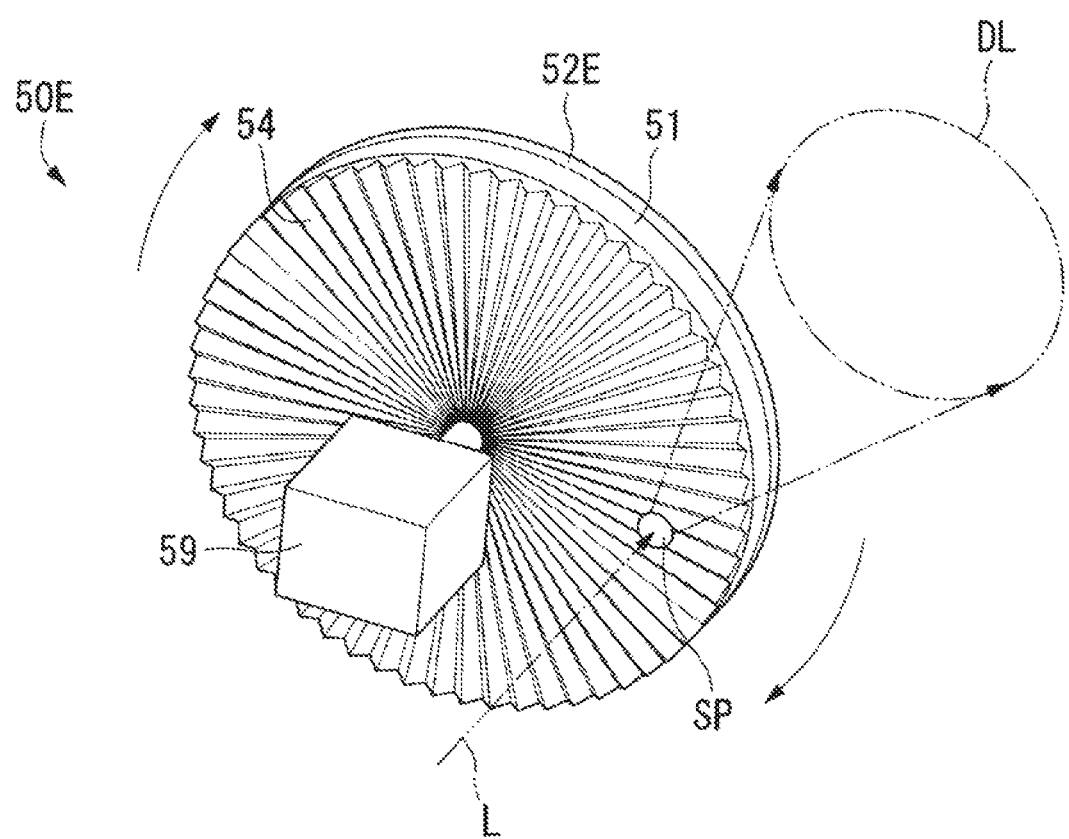
FIG. 8 is a schematic diagram illustrating a light diffusion element according to a fourth embodiment.
Figure 9A:
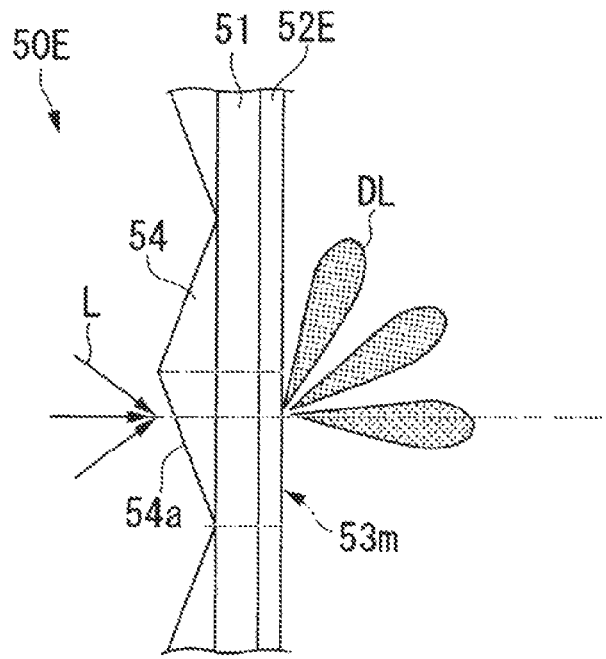
FIGS. 9A to 9D are schematic diagrams illustrating the light diffusion element according to the fourth embodiment.
Figure 9B:
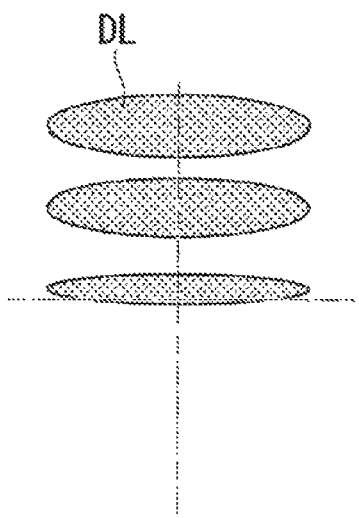
Figure 9C:
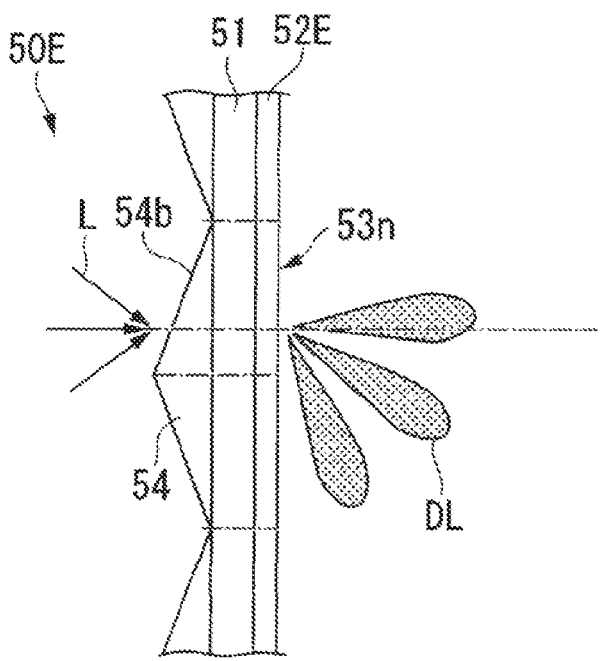
Figure 9D:
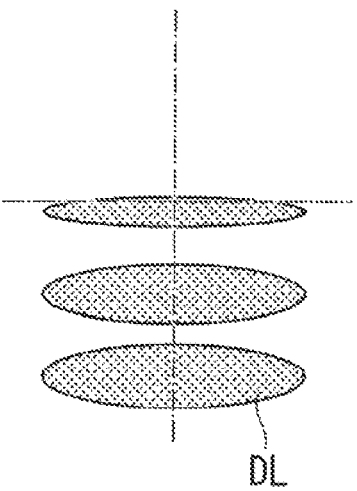

FIGS. 8 to 9D are schematic diagrams illustrating a light diffusion element according to the fourth embodiment, and are schematic diagrams illustrating a configuration including a prism layer 54 (prism structure) causing refraction of light. FIG. 8 is a schematic perspective view of the light diffusion element according to the present embodiment, and FIGS. 9A to 9D are diagrams corresponding to the above-described FIGS. 3A to 3D.

As illustrated in FIG. 8, in the light diffusion element 50E, the prism layer 54 in which a plurality of prisms are radially formed from the rotation shaft 58 is formed on the surface of the substrate 51 opposite to the surface on which a light diffusion layer 52E is provided.

In the light diffusion element 50E, the light diffusion layer 52E corresponds to the first layer according to the invention, and the prism layer 54 corresponds to the second layer according to the invention. In addition, the surface of the substrate 51 on which the light diffusion layer 52E is provided corresponds to one surface of the base according to the invention, and the surface on which the prism layer 54 is provided corresponds to the other surface of the base according to the invention.

As the light diffusion layer 52E, for example, the light diffusion layer having at least two regions with different diffusion characteristics as described above may be used. In the present embodiment, the light diffusion layer 52A described in the first embodiment is used as the light diffusion layer 52E.

The prism layer 54 is provided so as to overlap the light diffusion layer 52E in a plan view when an incidence direction of the incident light L is a plan view direction of the light diffusion element 50E, and overlaps a plurality of diffusion regions included in the light diffusion layer 52E in a plan view. FIGS. 9A and 9C illustrate the light diffusion element 50E in which a pitch of the prisms in the circumferential direction is the same as a pitch of a plurality of regions included in the light diffusion layer 52A in the circumferential direction, but a setting of the pitch of the prisms in the circumferential direction can be appropriately modified.

In addition, the prism layer 54 is not limited to the configuration in which a plurality of prisms are radially formed from the rotation shaft and light incident surfaces in the prism layer 54 are tilted in the circumferential direction, as illustrated in FIGS. 9A to 9D, and may have a configuration in which the light incident surfaces are tilted in other directions.

The prism layer 54 is light-transmissive, and refracts the applied incident light L.

The prism layer 54 has a first incidence surface 54a and a second incidence surface 54b of which tilt directions are different from each other. In the light diffusion element 50E, emission directions of the diffused light DL can be made different (FIGS. 9B and 9D) between in a case where the first incidence surface 54a is irradiated with the incident light L as illustrated in FIG. 9A and in a case where the second incidence surface 54b is irradiated with the incident light L as illustrated in FIG. 9C. In addition, since the light diffusion element 50E has the light diffusion layer 52A as the light diffusion layer 52E, the diffusion angle of the diffused light DL is also changed according to a rotation angle of the light diffusion element 50E.

For this reason, in the light diffusion element 50E according to the present embodiment, the diffusion angle and the diffusion direction of the diffused light DL are controlled as diffusion characteristics according to the rotation angle of the light diffusion element 50E. A region in which a diffusion angle and a diffusion direction of the diffused light DL are not changed even if a rotation angle of the light diffusion element 50E is changed is a first diffusion region 53m. In addition, another region, adjacent to the first diffusion region 53m, in which a diffusion angle and a diffusion direction of the diffused light DL are not changed even if a rotation angle of the light diffusion element 50E is changed is a second diffusion region 53n. As above, in the light diffusion element 50E according to the present embodiment, diffusion regions are defined by combination of a plurality of regions included in the light diffusion layer 52E (52A) and a plurality of incidence surfaces included in the prism layer 54.

In the embodiment described with reference to FIGS. 8 to 9D, the prism layer 54 and the light diffusion layer 52E having at least two regions with different diffusion characteristics from each other are used, but a light diffusion layer with uniform diffusion characteristics may be used instead of the light diffusion layer 52E. In this case, a region in which the light diffusion layer 52E overlaps the first incidence surface 54a in a plan view corresponds to the first diffusion region according to the invention, and a region in which the light diffusion layer 52E overlaps the second incidence surface 54b in a plan view corresponds to the second diffusion region according to the invention. In other words, comparing a case where the incident light L is incident on the first incidence surface 54a with a case where the incident light L is incident on the second incidence surface 54b, diffusion angles of the diffused light DL are the same, but emission directions thereof are different. In this example, a diffusion direction is controlled as diffusion characteristics for each of the first diffusion region and the second diffusion region adjacent to each other.

As in the light diffusion element 50E, even in a case where each of the first diffusion region and the second diffusion region is constituted by a plurality of members, the first diffusion region and the second diffusion region with different diffusion characteristics are provided, and thus if is possible to achieve an effect of reducing speckles.

According to this configuration, different diffusion structures can be formed in a single diffusion region, and thus a degree of freedom of design of the first diffusion region and the second diffusion region is improved. In addition, since a travel direction of light of which a diffusion angle is changed in the first layer can be further changed by the second layer, incidence angle distributions can be made considerably different. Therefore, it is possible to provide a light source apparatus capable of realizing illumination with a high speckle-reduction effect.

Fifth Embodiment

In the fourth embodiment, a configuration is used in which a region where the light diffusion layer 52E overlaps the first incidence surface 54a or the second incidence surface 54b in a plan view forms the first diffusion region or the second diffusion region, but the invention is not limited to this configuration. For example, a layer having a plurality of lens structures may replace the prism layer 54.

Figure 10A:
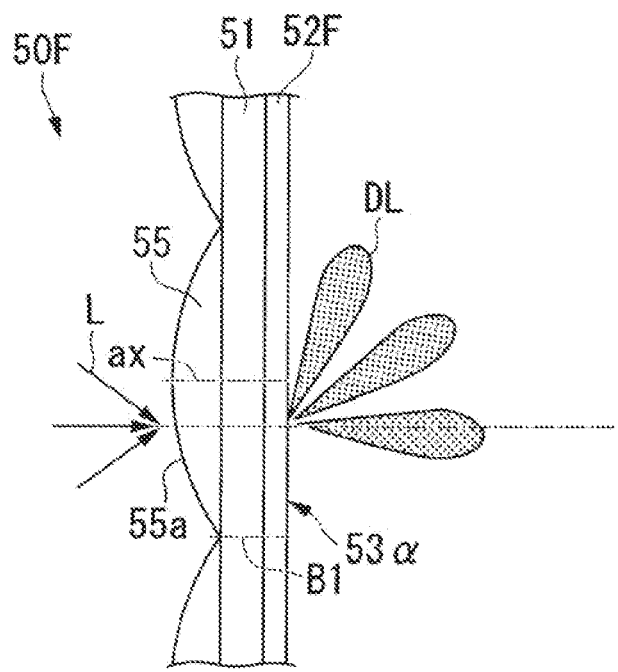
FIGS. 10A and 10B are schematic diagrams illustrating a light diffusion element according to a fifth embodiment.
Figure 10B:
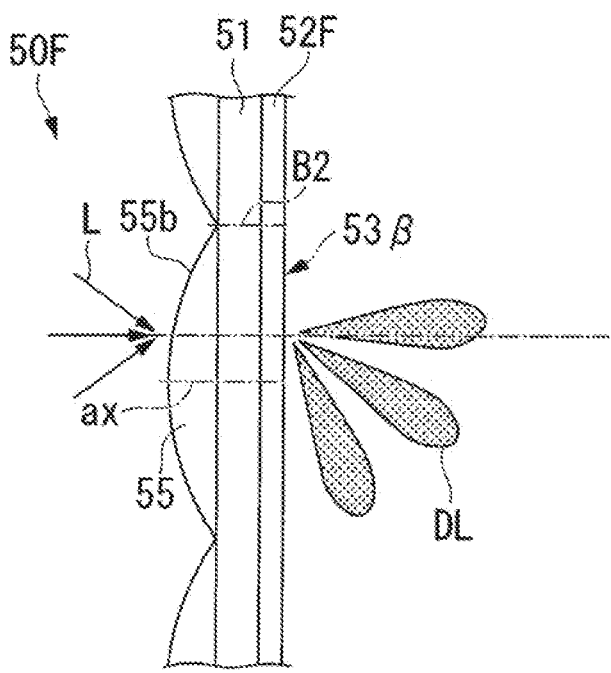

FIGS. 10A and 10B are schematic diagrams illustrating a light diffusion element according to the fifth embodiment, and are schematic diagrams illustrating a configuration including a lens layer 55 (lens structure) causing refraction of light. FIGS. 10A and 10B are diagrams corresponding to the above-described FIGS. 9A and 9C.

In the light diffusion element 50F, the lens layer 55 in which a plurality of lenses are formed is formed on the surface of the substrate 51 opposite to the surface on which a light diffusion layer 52F is provided. In the light diffusion element 50F, the light diffusion layer 52F corresponds to the first layer according to the invention, and the lens layer 55 corresponds to the second layer according to the invention. In addition, the surface of the substrate 51 on which the light diffusion layer 52F is provided corresponds to one surface of the base according to the invention, and the surface on which the lens layer 55 is provided corresponds to the other surface of the base according to the invention.

As the light diffusion layer 52F, for example, a light diffusion layer having at least two regions with different diffusion characteristics as described above may be used. In the present embodiment, the light diffusion layer 52A described in the first embodiment is used as the light diffusion layer 52F.

The lens layer 55 is provided so as to overlap the light diffusion layer 52F in a plan view when an incidence direction of the incident light L is a plan-view direction of the light diffusion element 50F, and overlaps a plurality of diffusion regions included in the light diffusion layer 52F in a plan view. The lens layer 55 may be entirely provided on the surface of the substrate 51 opposite to the surface on which the light diffusion layer 52F is provided, or may be selectively provided in a region on which the incident light L is incident. In addition, curvatures of a plurality of respective lenses forming the lens layer 55 may be the same as or different from each other.

The lens layer 55 is light-transmissive, and refracts the applied incident light L.

When exemplified, paying attention to a single lens of a plurality of lenses included in the lens layer 55, the lens has a first incidence surface 55a interposed between a lens optical axis ax and a boundary B1 with the adjacent lens and similarly a second incidence surface 55b interposed between the lens optical axis ax and a boundary B2 with another adjacent lens in a cross-sectional view in the plane including the optical axis of the lens.

In the light diffusion element 50F, emission directions of the diffused light DL can be made different between in a case where the first incidence surface 55a is irradiated with the incident light L as illustrated in FIG. 10A and in a case where the second incidence surface 55b is irradiated with the incident light L as illustrated in FIG. 10B. In addition, since the light diffusion element 50F has the light diffusion layer 52A as the light diffusion layer 52F, the diffusion angle of the diffused light DL is also changed based on a rotation angle of the light diffusion element 50F.

For this reason, in the light diffusion element 50F according to the present embodiment, the diffusion angle and the diffusion direction of the diffused light DL are controlled as diffusion characteristics based on the rotation angle of the light diffusion element 50F. A region in which the first incidence surface 55a overlaps the light diffusion layer 52F in a plan view is a first diffusion region 53α, and a region in which the second incidence surface 55b overlaps the light diffusion layer 52F in a plan view is a second diffusion region 53β. As above, in the light diffusion element 50F according to the present embodiment, diffusion regions are defined by combination of a plurality of regions included in the light diffusion layer 52F (52A) and a plurality of incidence surfaces included in the lens layer 55.

According to this configuration, different light diffusion structures can be formed in a single diffusion region, and thus a degree of freedom of design of the first diffusion region and the second diffusion region is improved. In addition, since a travel direction of light of which a diffusion angle is changed in the first layer can be further changed by the second layer, incidence angle distributions can be made considerably different. Therefore, it is possible to provide a light source apparatus capable of realizing illumination with a high speckle-reduction effect.

In addition, in the above-described embodiments, in the light diffusion elements 50A to 50F, an employed configuration for each of the light diffusion layers 52A to 52F includes the same kind of light diffusion structure, but the invention is not limited thereto. For example, in the first diffusion region and the second diffusion region adjacent to each other of the light diffusion layer, different kinds of light diffusion structures may be formed such as the diffraction structure being formed in the first diffusion region and the lens structure being formed in the second diffusion region.

In a light diffusion element with this structure, the diffusion angle is greatly changed at a boundary between the first diffusion region and the second diffusion region which are adjacent to each other, and thus it is possible to generate speckles with patterns which are remarkably different from each other. Therefore, it is possible to provide a light source apparatus capable of realizing illumination with a high speckle-reduction effect.

In addition, although, in the above-described embodiments, the light source unit 10 has a laser light source array, only a single laser light source may be used. Further, the light source unit 10 is not limited to a laser light source, and may have other light sources which emit light with high coherence, such as an LED or a lamp light source with a shortened arc.

Sixth Embodiment

In the above-described embodiments, the light source unit 10 has a laser light source array, and, during an operation of a light source apparatus or a projector, the overall laser light source array may be turned on at all times, or output of at least one laser light source 11 of a plurality of laser light sources 11 may be intermittently changed. In this case, the control unit 90 controls the output of the laser light sources 11.

With reference to FIGS. 11A to 11D, a description will be made of a case where outputs of some laser light sources 11 of a plurality of laser light sources 11 are intermittently stopped. FIGS. 11A to 11D are diagrams illustrating a state of light emitted from the light diffusion element 50A when output control of the laser light source is performed in a light source apparatus according to the sixth embodiment, and are diagrams corresponding to FIGS. 3A to 3D.

Figure 11A:
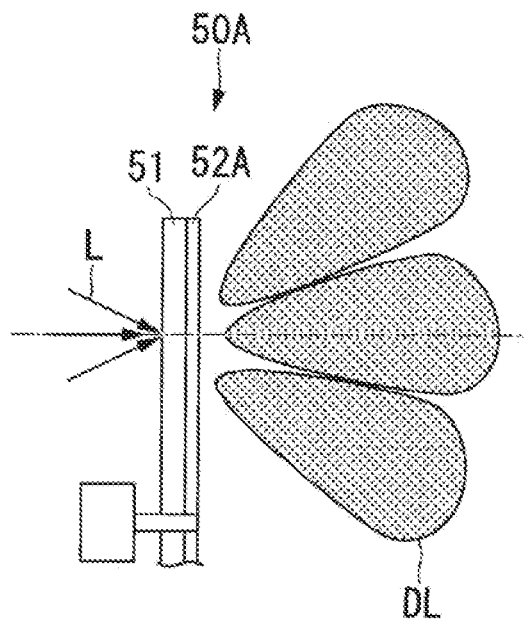
FIGS. 11A to 11D are schematic diagrams illustrating a light diffusion element according to a sixth embodiment.
Figure 11B:
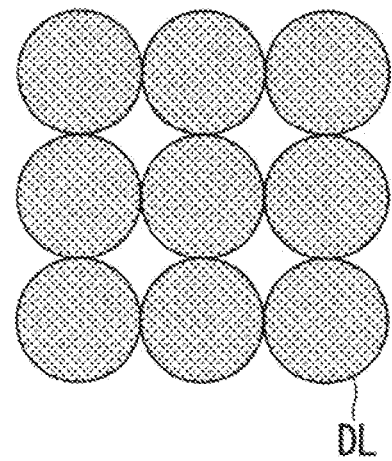
Figure 11C:
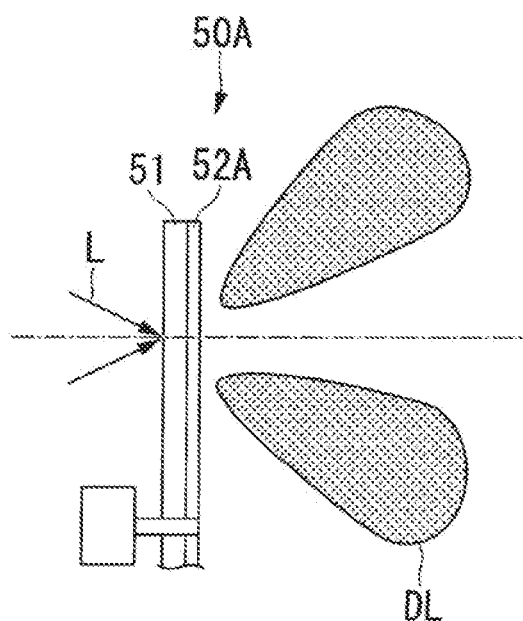
Figure 11D:
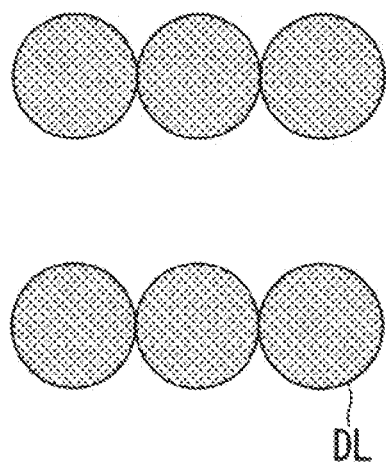

As illustrated in FIGS. 11A to 11D, cross-sectional shapes of the diffused light DL are different between in a case where all the laser light sources 11 are turned on (FIGS. 11A and 11B) and in a case where some laser light sources of the plurality of laser light sources 11 are turned off (FIGS. 11C and 11D). Accordingly, speckles corresponding to incidence angle distributions occur in image light incident on the screen.

As above, it is possible to provide an image with remarkably reduced speckles to an observer of an image by using a change in an incidence angle distribution of image light which is caused by the above-described rotation of the light diffusion element 50A and a change in the incidence angle distribution of image light which is caused by turning-on and turning-off of the laser light source array.

Even using the light source apparatus, in which control is performed so as to intermittently stop outputs of some laser light sources of a plurality of laser light sources 11 as illustrated in FIGS. 11A to 11D, in a projector makes it possible to display an image with fewer speckles. In addition, even in a projector using this light source apparatus, it is possible to display a high quality image with fewer speckles.

In the laser light source, an output thereof is not instantaneously stabilized when the laser light source is turned on in a state where the output stops. For this reason, taking into consideration a responsiveness of the output of the laser light source, it is preferable to change an output of the laser light source between a high output state and a low output state rather than to make the laser light source blink, when an output of the laser light source is intermittently changed. Even by intermittently reducing outputs of some laser light sources of a plurality of laser light sources 11, it is possible to provide an image with considerably fewer speckles.

In addition, outputs of the laser light sources which are identical at all times, of a plurality of laser light sources 11, may be intermittently changed, but outputs of the laser light sources different over time, are preferably intermittently changed. Accordingly, a light amount distribution of the diffused light DL can be effectively changed, and thus a plurality of different speckles can be made to occur over time based on the incidence angle distribution.

When outputs of some laser light sources 11 of a plurality of laser light sources 11 are stopped or reduced, the control unit 90 may increase outputs of the other laser light sources 11 of the plurality of laser light sources 11. Accordingly, it is possible to reduce a variation in a total amount of light emitted from the light source unit 10. In addition, in order to supplement a reduction in a light amount which is caused by stopping or reducing outputs of some laser light sources of a plurality of laser light sources 11, an amount of light emitted from the other laser light sources is preferably increased based on an amount of light to be emitted from the light source unit 10. Accordingly, an amount of light emitted from the light source unit 10 can be made constant, and thus speckles can be reduced and a favorable image can be displayed.

In addition, it is possible to achieve the effect of reducing speckles to an extent even by using only the configuration in which outputs of some laser light sources of a plurality of laser light sources 11 are intermittently changed, and thus a difference between diffusion characteristics of the first diffusion region and diffusion characteristics of the second diffusion region may be relatively small as long as outputs of some laser light sources are intermittently changed.

Seventh Embodiment

Figure 12:
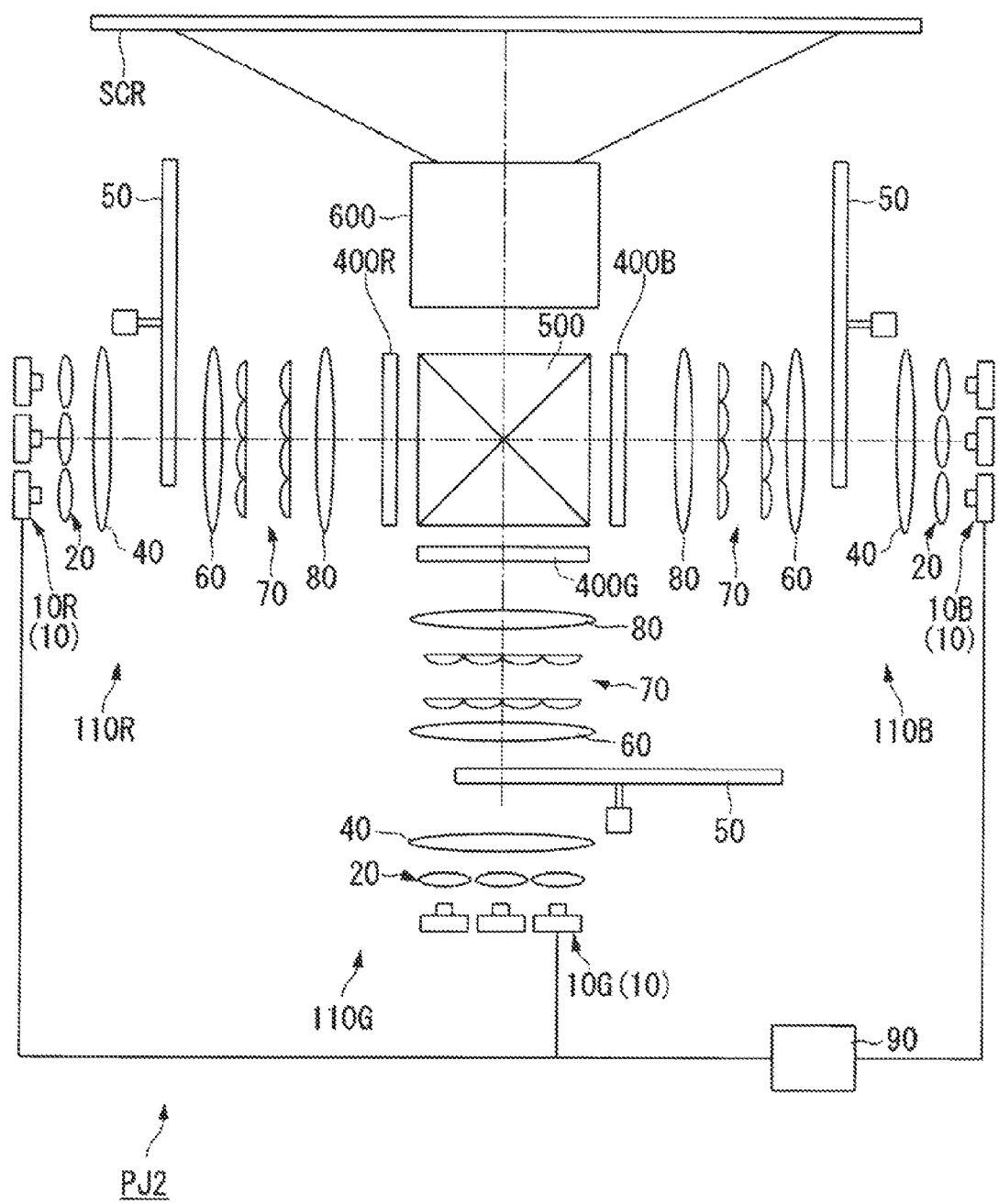
FIG. 12 is a diagram illustrating a projector according to a seventh embodiment.

FIG. 12 is a diagram illustrating a projector PJ2 according to the seventh embodiment of the invention. The projector PJ2 according to the present embodiment is partially the same as the projector PJ1 according to the first embodiment. Therefore, in the present embodiment, a constituent element common to the first embodiment is given the same reference numeral, and a detailed description thereof will be omitted.

The projector PJ2 has a light source apparatus for each of the liquid crystal light valve 400R, the liquid crystal light valve 400G, and the liquid crystal light valve 400B. In other words, in the first embodiment, the light source apparatus 100 has a configuration in which red light, green light, and blue light are combined in advance, and then a diffusion angle is changed using the light diffusion element, and the projector PJ1 having the light source apparatus 100 includes the color split optical system 200. On the other hand, the projector PJ2 has a configuration in which red light emitted from a light source apparatus 110R is incident on the liquid crystal light valve 400R, green light emitted from a light source apparatus 110G is incident on the liquid crystal light valve 400G, and blue light emitted from a light source apparatus 110B is incident on the liquid crystal light valve 400B, thereby forming image light.

Even using the light source apparatus 110R, the light source apparatus 110G, and the light source apparatus 110B with this configuration in a projector makes it possible to display an image with fewer speckles. In addition, even in the projector PJ2 using the light source apparatus 110R, the light source apparatus 110G, and the light source apparatus 110B, it is possible to display a high quality image with fewer speckles.

As stated above, although the preferred embodiments related to the invention have been described with reference to the drawings, the invention is not limited to the embodiments. All the shapes or combinations of constituent members described in the above embodiments are only examples, and may be variously modified within the scope if there are any design requests or the like as long as it does not depart from the spirit of the invention.

For example, in the above-described embodiments, a description has been made of an example in which the invention is applied to the liquid crystal projector using three liquid crystal light valves, but the invention is not necessarily limited thereto. For example, the invention may be applied to a color sequential type single-plate liquid crystal projector. In addition, the invention may be applied to a projector using a light modulation device such as a liquid crystal on silicon (LCOS) or a Digital Mirror Device Further, in the above-described embodiments, luminance distributions of light emitted from the pickup lens 60 are made to be uniform using the lens arrays 70 and the superimposition lens 80, but luminance distributions of light emitted from the pickup lens 60 may be made to be uniform using a well-known configuration such as a CGH or a rod integrator.

In addition, in the above-described embodiments, a description has been made of a case where the light diffusion layer (light diffusion structure) of the light diffusion element is formed on the surface on the side where diffused light is emitted from the light diffusion element, but the light diffusion layer may be formed on the surface on the side where light is incident on the light diffusion element.

Further, in the above-described embodiments, it is illustrated that the light diffusion layer (light diffusion structure) of the light diffusion element is formed on the entire surface of the substrate, but the light diffusion layer may be formed only in a region to which incident light can be applied. For example, the light diffusion layer may be formed in an annular shape so as to consecutively extend in the circumferential direction on one surface of the substrate.

The entire disclosure of Japanese Patent Application No. 2013-032096, filed on Feb. 21, 2013 is expressly incorporated by reference herein.

What is claimed is:

1. A light source apparatus comprising:
a light source unit;
a light diffusion element that is provided so as to be rotated about a predetermined rotation shaft and includes a plurality of diffusion regions which are consecutively formed around the rotation shaft; and
a driving device that rotates the light diffusion element so that a region on which light from the light source unit is incident in the light diffusion element is moved between the plurality of diffusion regions,
wherein the plurality of diffusion regions include a first diffusion region, and a second diffusion region which has second diffusion characteristics different from first diffusion characteristics of the first diffusion region and is provided so as to be adjacent to the first diffusion region, the first diffusion region having the first diffusion characteristics consistently across the entire first diffusion region, and the second diffusion region having the second diffusion characteristics consistently across the entire second diffusion region.

2. The light source apparatus according to claim 1, wherein
at least one light diffusion structure selected from the group consisting of a light scattering structure, a diffraction structure, and a lens structure is provided in the first diffusion region, and
at least one light diffusion structure selected from the group is provided in the second diffusion region.

3. The light source apparatus according to claim 2, wherein
a light diffusion structure provided in the first diffusion region is different from a light diffusion structure provided in the second diffusion region.

4. The light source apparatus according to claim 1, wherein
the light diffusion element includes a plate-shaped base, a first layer provided on one surface of the base, and a second layer provided on the other surface of the base,
wherein, in the plurality of diffusion regions, the first layer overlaps the second layer in a plan view when a direction in which light is incident on the light diffusion element is a plan view direction,
at least one light diffusion structure selected from the group consisting of a light scattering structure, a diffraction structure, and a lens structure is provided in the first layer, and
at least one of a prism structure and a lens structure is provided in the second layer.

5. The light source apparatus according to claim 1, wherein the light source unit includes:
a plurality of light sources; and
a condensing optical system that collects light beams emitted from the plurality of light sources at the light diffusion element.

6. The light source apparatus according to claim 5, further comprising
a control unit that intermittently changes an output of at least one light source out of the plurality of light sources.

7. The light source apparatus according to claim 6, wherein
the control unit reduces an output of a light source of the plurality of light sources while the control unit increases outputs of the other light sources of the plurality of light sources.

8. A projector comprising:
the light source apparatus according to claim 1;
a light modulation element that modulates light emitted from the light source apparatus;
a superimposition optical system that divides light emitted from the light diffusion element into a plurality of small light beams and superimposes the plurality of small light beams on the light modulation element; and a projection optical system that projects light modulated by the light modulation element.

9. A projector comprising:

the light source apparatus according to claim 2;

a light modulation element that modulates light emitted from the light source apparatus;

a superimposition optical system that divides light emitted from the light diffusion element into a plurality of small light beams and superimposes the plurality of small light beams on the light modulation element; and a projection optical system that projects light modulated by the light modulation element.

10. A projector comprising:

the light source apparatus according to claim 3;

a light modulation element that modulates light emitted from the light source apparatus;

a superimposition optical system that divides light emitted from the light diffusion element into a plurality of small light beams and superimposes the plurality of small light beams on the light modulation element; and a projection optical system that projects light modulated by the light modulation element.

11. A projector comprising:

the light source apparatus according to claim 4;

a light modulation element that modulates light emitted from the light source apparatus;

a superimposition optical system that divides light emitted from the light diffusion element into a plurality of small light beams and superimposes the plurality of small light beams on the light modulation element; and a projection optical system that projects light modulated by the light modulation element.

12. A projector comprising:

the light source apparatus according to claim 5;

a light modulation element that modulates light emitted from the light source apparatus;

a superimposition optical system that divides light emitted from the light diffusion element into a plurality of small light beams and superimposes the plurality of small light beams on the light modulation element; and a projection optical system that projects light modulated by the light modulation element.

13. A projector comprising:

the light source apparatus according to claim 6;

a light modulation element that modulates light emitted from the light source apparatus;

a superimposition optical system that divides light emitted from the light diffusion element into a plurality of small light beams and superimposes the plurality of small light beams on the light modulation element; and a projection optical system that projects light modulated by the light modulation element.

14. A projector comprising:

the light source apparatus according to claim 7;

a light modulation element that modulates light emitted from the light source apparatus;

a superimposition optical system that divides light emitted from the light diffusion element into a plurality of small light beams and superimposes the plurality of small light beams on the light modulation element; and a projection optical system that projects light modulated by the light modulation element.

\* \* \* \* \*